United States Patent [19]

Cognard et al.

[11] 4,358,392

[45] Nov. 9, 1982

[54] LIQUID CRYSTAL-BASE COMPOSITION FOR AN ELECTRO-OPTICAL DEVICE

[75] Inventors: Jacques Cognard, Chezard; Trung H. Phan, Tannay, both of Switzerland

[73] Assignee: Asulab S.A., Bienne, Switzerland

[21] Appl. No.: 237,735

[22] Filed: Feb. 24, 1981

[30] Foreign Application Priority Data

Mar. 14, 1980 [CH] Switzerland ............... 2010/80

[51] Int. Cl.³ .................... C09K 3/34; G02F 1/13
[52] U.S. Cl. .................... 252/299.1; 350/349
[58] Field of Search .................. 252/299.1; 350/349

[56] References Cited

U.S. PATENT DOCUMENTS

| | | | |
|---|---|---|---|
| 4,232,950 | 11/1980 | Bemham | 252/299.1 |
| 4,273,929 | 6/1981 | Doller et al. | 252/299.1 |
| 4,288,147 | 9/1981 | Koch | 252/299.1 |
| 4,299,720 | 11/1981 | Osman et al. | 252/299.1 |
| 4,304,683 | 12/1981 | Morinaka et al. | 252/299.1 |

FOREIGN PATENT DOCUMENTS

| | | | |
|---|---|---|---|
| 26004 | 4/1981 | European Pat. Off. | 252/299.1 |
| 3009974 | 9/1980 | Fed. Rep. of Germany | 252/299.1 |
| 2037803 | 7/1980 | United Kingdom | 252/299.1 |

OTHER PUBLICATIONS

Cognard, J., et al., Mol. Cryst. Liq. Cryst., vol. 70, pp. 1-19, (1981).

*Primary Examiner*—Teddy S. Gron
*Attorney, Agent, or Firm*—Young & Thompson

[57] ABSTRACT

The liquid crystal-base composition for an electro-optical device contains an anthraquinone pleochroic coloring agent of formula (I) as defined in claim 1, that is to say, with in particular at least one hydroxy or amino group in position 1 and a heterocyclic side chain which is directly substituted in position 2, or 2 and 6, or 3, or 3 and 7.

The compounds (I) have a high order parameter and are stable, thereby imparting to the compositions the properties required for use thereof for example in a display device.

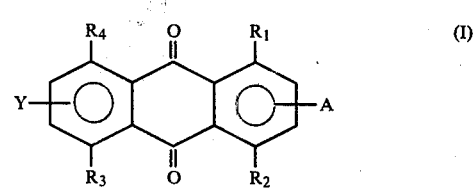

11 Claims, No Drawings

LIQUID CRYSTAL-BASE COMPOSITION FOR AN ELECTRO-OPTICAL DEVICE

The present invention relates to a liquid crystal-base composition which contains an anthraquinone pleochroic colouring agent in solution and which can be used in electro-optical devices, more particularly in display devices.

A colouring agent can be suitably used in solution in a liquid crystal for a display device, if it has at least the following properties:
it must be sufficiently soluble in the liquid crystal;
it must be stable chemically (in particular, inert with respect to the liquid crystal) and especially photochemically (stable in regard to UV-light);
it must have a sufficient intensity of absorption; and
it must not contain ionic or ionisable groups.

In addition, such a colouring agent must have a high order parameter "S", which parameter corresponds to the capability of orientation of the colouring agent by the molecules of the liquid crystal, in order to be able to produce a high-contrast display. Finally, the base structure of the compounds envisaged must obviously correspond to a suitable colour for use in a display device, preferably blue and red.

In their Swiss application No. 7543/79 of 17th Aug. 1979 (see U.K. 2,061,994), the applicant describes a liquid crystal-base composition for use in electro-optical devices, especially display devices. The composition contains in solution an anthraquinone derivative having the following general formula:

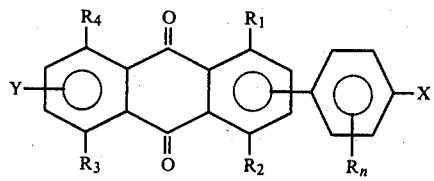

which can be used as a pleochroic colouring agent and which has in particular a high order parameter, and a high level of stability with respect to light.

Continuing their research, the present inventors have discovered that other anthraquinone colouring agents of the same type but with a heterocyclic substituent are also valuable pleochroic colouring agents which can be used in liquid crystal-base compositions.

The present invention is therefore concerned with a liquid crystal-base composition containing at least one pleochroic colouring agent of formula (I):

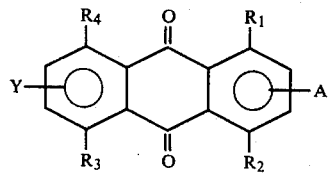

(I)

wherein $R_1$ is an amino group which can be alkylated or acylated or an alkoxy or a hydroxy group; $R_2$, $R_3$ and $R_4$ which are identical or different are each a hydrogen atom, an amino group which may be alkylated or acylated, an alkoxy group, a hydroxy group, a nitro group, a halogen atom or a cyano group; A is a cycloalkane having a maximum of 8 carbon atoms, a cycloalkene having a maximum of 8 carbon atoms, or a saturated or unsaturated heterocycle having five or six members, which may contain up to 4 heteroatoms; and Y is a hydrogen atom or a side chain identical to A as defined hereinbefore.

The group A may be for example of the preferred formulae set out below:

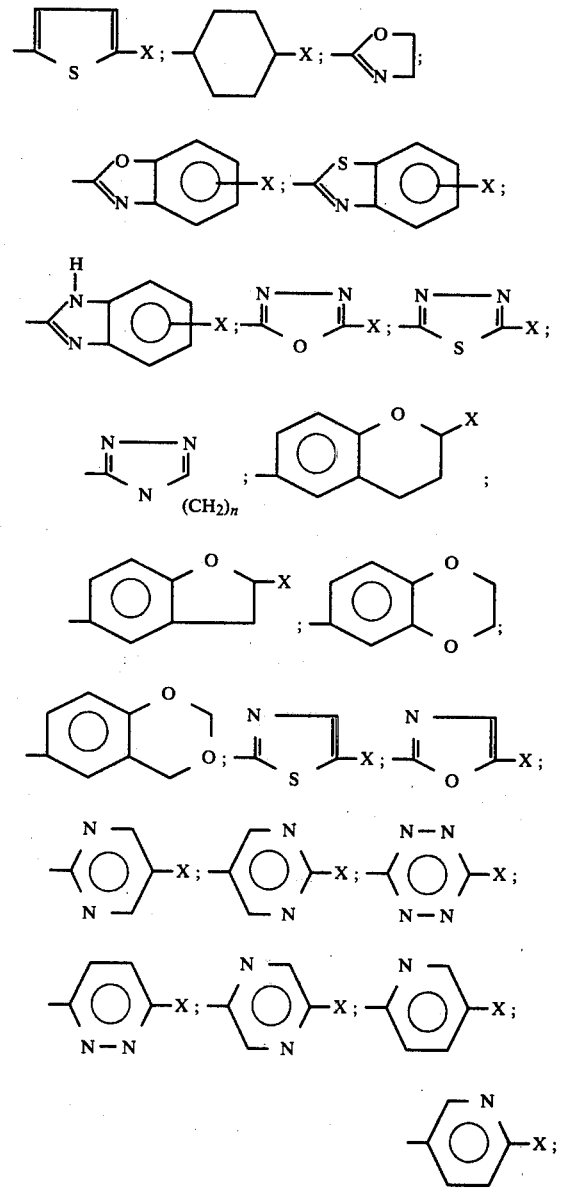

in which X is a hydrogen atom, a halogen atom, a cyano group, a cyclic, branched or straight alkyl chain, an alkoxyalkyl chain, a hydroxyalkyl chain, a pyridyl group, a benzyl group, a phenyl group, a para-alkylphenylene group, a para-alkoxyphenylene group, a para-cyanophenylene group with at most 10 C atoms or a group selected from OR', SR', OOCR', OOC—$C_6H_4$—R', SOC—$C_6H_4$—R', NHR', NHCOR', OCOOR' and OCOO—$C_6H_4$—R', in which R' is a hydrogen atom, a cyclic, branched or straight alkyl chain, an ethoxycarbonylalkyl chain, a cyanoalkyl chain or a phenyl group, with at most 10 C atoms, and n is an integer of from 3 to 7.

Preferably, the group Y is in position 6 when A is substituted in position 2 on the anthraquinone ring and in position 7 when A is substituted in position 3.

The order parameter as measured in a liquid crystal of the colouring agent of formula (I) is generally higher when Y=A than when Y=H.

The length of the side chain or chains determines at least in part the solubility of the compound of formula (I) and consequently should not exceed about 24 carbon atoms. The substituents X each preferably have 10 carbon atoms at most, but when a plurality of such groups are present simultaneously, the total of the carbon atoms does not in principle exceed about 24. Above this limit, the compound (I) may not be sufficiently soluble in the liquid crystal and consequently cannot be used as a colouring agent therefor.

The invention will now be illustrated by means of Examples in which the properties of two compounds of formula (I), Nos. (32) and (33) respectively as set forth in Table I hereinafter, have been studied. More particularly, the solubility and the order parameter of such compounds have been measured, using the following known methods:

Solubility

A saturated solution of each compound (I) is prepared in a liquid crystal, and the resulting solution is filtered. Then 100 μl of the filtrate are taken off and dissolved in 50 cc of chloroform.

The optical density of each solution is then measured spectroscopically and the concentration of the colouring agent at saturation is deduced from that measurement, the absorption coefficient in chloroform being known.

The results obtained are set forth in Table I below. With regard to the values of solubility, it should be noted that the solutions were considered as being saturated when they contained grains of colouring agent after heating in the isotropic phase and agitation for 3 minutes.

Order parameter (S)

A 0.5% solution of each compound studied, in a liquid crystal, is introduced into a 30μ thick glass cell which is covered with an alignment film (SiO$_x$ evaporated tangentially or rubbed polyimide). The optical density of each solution is measured at its maximum absorption for polarised light respectively when the direction of the polarising means is parallel (D$_\parallel$) and perpendicular (D$_\perp$) to the alignment direction. The order parameter is calculated from the following relationship:

$$S = (r-1)/(r+2)$$

in which r is the dichroic ratio corresponding to the ratio D$_\parallel$/D$_\perp$.

The results obtained are also set forth in Table I below.

TABLE I
Properties of the compounds of formula (I)

| No. | Compound (I) | Melting point (°C.) | Solubility in LC (%) | Optical properties λ max (nm) CHCl$_3$ | CL | Order parameter CL |
|---|---|---|---|---|---|---|
| (32) | 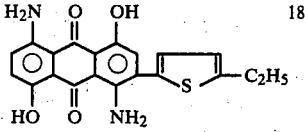 | 189–191 | 1,2 | 586 / 624 | 605 / 648 | 0,65 / 0,66 |
| (33) | 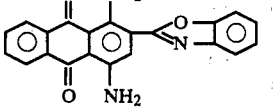 | >300 | 0,2 | 596 / 633 | 604 / 647 | 0,71 / 0,71 |

N.B. The liquid crystal (LC) in which solubility and order parameter have been measured is "E7" of BDH Chemica Limited.

The compounds of formula (I) which can be used as colouring agents in solution in liquid crystals for display devices can be prepared by the known methods used for synthesizing the anthraquinone compounds.

In the composition of the invention, it is possible to use either a single type of liquid crystal or, preferably, a mixture of liquid crystals such as those delivered for example by BDH Chemicals Limited under references E3, E7, E8 or E9, the respective compositions of which are disclosed in published European patent application No. 78 300 487.2 or by Hoffmann-La-Roche under the references ROTN-103 or ROTN-404. These are preferably nematic liquid crystals of positive or negative anisotropy, which may or may not also contain an optically active agent.

In addition, the composition of the invention may comprise a plurality of colouring agents of formula (I) or possibly other types of anthraquinone colouring agents, and also a cholesterisation agent and/or an alignment agent. As an example, the cholesteric agent may be that delivered by BDH Chemicals Limited under the reference "CB 15" (about 3% with respect to the total composition). The alignment agent (intended to disperse the molecules of the liquid crystals perpendicularly to the walls of the electro-optical device) may be a surfactant, for example a sorbitol monoester, sorbitol monolaurate being particularly suitable (about 2% with respect to the total composition).

Finally, the pleochroic colouring agent of formula (I) is generally present in the composition according to the invention in an amount corresponding to about 0.5 to 5% of the total composition, and preferably about 1.5%.

Although the colouring agents of formula (I) have the desired properties in all the usual commercial liquid crystals, it is advantageous for the substituent A of formula (I) to be adapted to the nature of the liquid crystal used. Many liquid crystals which are generally used have the following general formula:

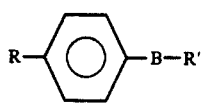

in which R and R' (identical or different) are an alkyl or alkoxy chain or a polar group such as —C≡N; and B is a cycloalkane or a heterocycle. Thus, optimum properties will be attained, from the point of view of both the order parameter of the colouring agent and the solubility thereof, by associating the colouring agent (I) with a liquid crystal of the above-indicated formula, in which A and B are identical.

We claim:

1. A liquid crystal guest-host composition containing a liquid crystalline host and a guest pleochroic colouring agent for use in an electro-optical device, wherein said colouring agent is an anthraquinone compound represented by the general formula (I):

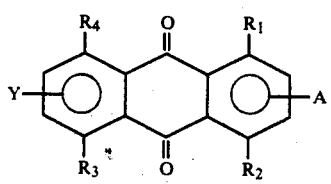

in which $R_1$ is an amino group which can be alkylated or acylated, an alkoxy group or a hydroxy group; $R_2$, $R_3$ and $R_4$ which are identical or different are each a hydrogen atom, an amino group which can be alkylated or acylated, a substituted or unsubstituted an alkoxy group, a hydroxy group, a nitro group, a halogen atom or a cyano group; A is selected from the group consisting of

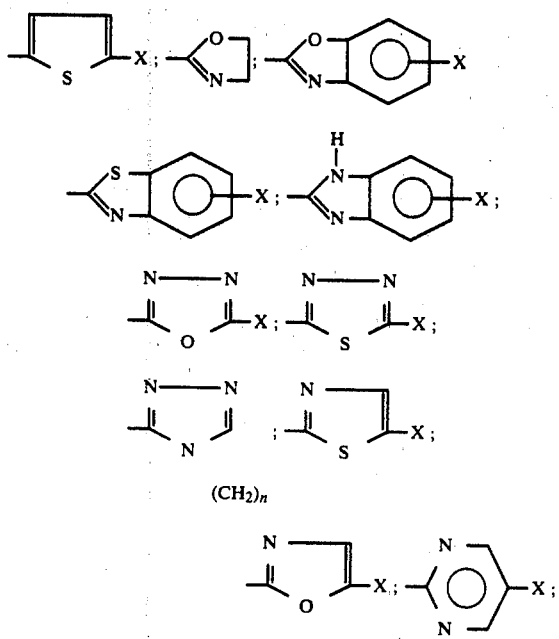

in which X is a hydrogen atom, a halogen atom, a mercaptan group, a cyano group, a cyclic, branched or straight alkyl chain, an alkoxyalkyl chain, a hydroxyalkyl chain, a pyridyl group, a benzyl group, a phenyl group, a para-alkylphenylene group, a para-alkoxyphenylene group, a para-cyanophenylene group, with at most 10 C atoms, or a group selected from OR', SR', OOCR', OOC—$C_6H_4$—R', SOC—$C_6H_4$—R', NHR', NHCOR', OCOOR' and OCOO—$C_6H_4$—R', in which R' is a hydrogen atom, a cyclic, branched or straight alkyl chain, an ethoxycarbonylalkyl chain, a cyanoalkyl chain or a phenyl group, with at most 10 C atoms, and n is an integer of from 3 to 7, and Y is a hydrogen atom or a side chain having the same definition as A.

2. A composition according to claim 1 wherein Y is in position 6 of the anthraquinone ring when A is substituted in position 2 and in position 7 when A is substituted in position 3.

3. A composition according to claim 1 wherein the anthraquinone base structure which is substituted in position 2 or 2 and 6 or 3 or 3 and 7 is selected from the group comprising 1-aminoanthraquinone, 1,4-diaminoanthraquinone, 1,5-diaminoanthraquinone, 1-amino-4-hydroxyanthraquinone, 1,8-diamino-4,5-dihydroxy-anthraquinone, 1,4-diamino-5-nitroanthraquinone, 1,4,5,8-tetraminoanthraquinone, 1,5-diamino-4,8-dihydroxyanthraquinone and 1-amino-4-nitroanthraquinone.

4. A composition according to claim 1 wherein the colouring agent is represented by the formula

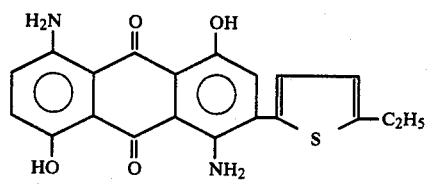

5. A composition according to claim 1 wherein the colouring agent is represented by the formula:

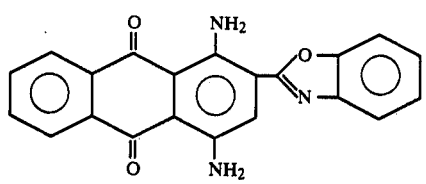

6. A composition according to claim 1 comprising one or more nematic liquid crystals of positive or negative anisotropy.

7. A composition according to claim 6 comprising an optically active agent inducing a cholesteric structure and/or an alignment agent.

8. A composition according to claim 1 containing a solution of from 0.5 to 5% of an anthraquinone colouring agent of formula (I).

9. A composition according to claim 1 comprising about 1.5% of an anthraquinone colouring agent of formula (I), about 3% of an optically active agent inducing a cholesteric structure and about 2% of an alignment agent.

10. A composition according to claim 1 comprising at least one other anthraquinone colouring agent of formula (I).

11. A composition according to claim 1 comprising at least one other anthraquinone colouring agent different from those represented by formula (I).

* * * * *